3,285,872
ADHESIVES COMPRISING CARBOXYL-CONTAINING DIENE POLYMER, POLYESTER POLYMER, AND A POLYISOCYANATE
George E. Faber, White Bear Lake, Minn., assignor to Minnesota Mining and Manufacturing Company, St. Paul, Minn., a corporation of Delaware
No Drawing. Filed Sept. 1, 1965, Ser. No. 484,423
18 Claims. (Cl. 260—30.4)

This application is a continuation-in-part of my application Serial No. 385,065, filed July 24, 1964, now abandoned and of my application Serial No. 96,712, filed March 20, 1961, now abandoned. This invention relates to an adhesive or cement composition and the method of applying same. In one aspect, the invention relates to a contact bond adhesive for bonding surfaces. In still another aspect, this invention relates to a new high green strength and a high ultimate strength contact bond two-part adhesive.

Compositions suitable for adhering or bonding two surfaces together are known in the art. In many instances, such adhesives or cements are applied to the surfaces in a paste or liquid form and then are cured to a tough, strong bond between the surfaces. In utilizing the adhesive to bond together two surfaces, some technique must be used to hold the surfaces securely together until the adhesive is cured to complete the bond. One of the most frequent and usual applications of this bonding technique is the bonding together of wood to wood laminates and synthetic plastic to wood laminates. For such applications, the adhesive is placed between the overlying elements of the laminate. Then, the laminate structure is securely held together until curing of the bond is completed, by means of clamps, presses and the like. Heat is usually employed to initiate and complete the cure of the adhesive. The above technique, in such instances, is cumbersome and requires extra labor and time.

It is much to be desired to provide an improved contact bond adhesive which can be easily applied and has a sufficient initial bond strength to hold the surfaces together until curing is effected without the necessity of external means therefor.

The object of this invention is to provide a new high initial strength adhesive or cement system.

Still another object of this invention is to provide an improved technique of bonding or adhering together two surfaces.

Another object of this invention is to provide a solvent-resistant and heat stable bond between two surfaces.

Yet another object of this invention is to provide a room temperature or low temperature curable composition.

Another object of this invention is to provide a two-part adhesive or bonding system having high ultimate strength.

Various other objects and advantages will become apparent to those skilled in the art from the accompanying description and disclosure.

According to this invention, a two-part adhesive or bonding system is provided in which one part includes a curing agent or cross-linking agent and the other part includes a curable composition which completes the bond when cured. These two parts are usually maintained separate until bonding of the material or surfaces is desired. However, the parts may be pre-mixed without undue reactivity if the mixture is stored at a temperature of 0° F. and below. But, for convenience of description the adhesive is generally referred to as a two-part adhesive. When the adhesive is applied to the surface or surfaces to be joined following mixing of the parts, the surfaces are brought into adhesive contact and maintained together until the bond is cured.

An essential feature of the present invention is the inclusion in this two-part curable adhesive of a high green strength component, usually an elastomer, which also forms an ingredient of the curable composition of the adhesive. This green strength component holds the surfaces to be bonded together until curing is complete without the necessity for clamps and presses, thus eliminating the necessity for special techniques in maintaining the surfaces in contact.

The curable composition comprises, in addition to this green strength component, a curable polymer which in its cured form provides a substantial proportion of the ultimate high strength necessary for the bond. The green strength component, being also curable adds to the overall strength of the cured adhesive. In addition to the above components, suitable fillers may be included in this system with either or both parts thereof. Fillers, such as silica, titanium dioxide or carbon black, impart strength and improve the viscosity and bodying properties to the precured composition as well as the cured composition.

Since the composition of this invention is utilized to bond surfaces together, it must be applied in the form of a liquid or paste. Therefore, the parts of the adhesive are preferably separately dissolved in a suitable liquid solvent. Fillers may be incorporated as ingredients in either of the separate solutions or both. If different solvents are used for each part, the solvents must be mutually compatible and mutually capable of dissolving all of the active components in each part, except of course, the fillers and the like. Usually the same solvent is used for each part; i.e., for the curable components comprising one part and the curing agent comprising the other part. The solutions are mixed prior to use. The resulting solution after admixture may have a viscosity as low as about 50 centipoises at 20° C., preferably at least 150 centipoises at 20° C. The composition should be such that it has a sufficient amount of tack following solvent evaporation to adhesively bind the surfaces to one another such tack being present after about 10 to about 120 minutes of drying. The composition of this invention is usually curable at room temperature and in any case at moderate temperatures of not higher than about 40 or 50° C. Where the composition of this invention requires elevated temperatures for curing, such as temperatures above 35° C., the components may be pre-mixed and used without the necessity for maintaining separate parts, e.g. separating the curable polymers and the curing agent.

The green strength component of the above system comprises a carboxylic acid modified conjugated diene polymer, preferably a rubber or elastomer, containing about 0.1% to about 10% by weight acid as determined by titration of the polymer in a suitable solvent with a suitable base, e.g. potassium hydroxide. Preferably, the polymer has an average of between about 2 and about 5% acid. This green strength component imparts initial bonding strength to the adhesive composition. The average molecular weight of the diene polymer should be above 20,000 and as high as 100,000 or higher in order to impart the necessary initial strength and physical characteristics to the adhesive. This green strength component should preferably have an initial shear strength after solvent release and prior to cure of between about 50 and about 200 pounds per square inch.

The green strength polymer is prepared from a monomer composition in which the major monomer is the conjugated diene. The carboxylic acid groups are provided in the green strength polymer by copolymerization of the diene with an alpha-beta-unsaturated monocarboxylic acids, such as acrylic acid or methacrylic acid as a comonomer. The green strength polymer may also include a third monomer, which is usually larger in amount than the monocarboxylic acid utilized to produce the carboxylic acid groups. Such acid modified diene polymers, containing carboxylic acid groups, are known in the art and are available on the open market. These polymers may be made by including an acid in an amount between about 0.1 and about 10 weight percent by weight of the monomer mixture. In case a third monomer is used, it may be present in the monomer mixture in an amount between about 5 and 30 weight percent.

Typical examples of diene polymers or rubbers satisfying the above requirements and available commercially are those produced by the interpolymerization of (1) butadiene, acrylonitrile, and acrylic acid; (2) butadiene and acrylic acid; (3) isoprene and methacrylic acid; (4) butadiene, styrene and acrylic acid; (5) butadiene, isobutylene and acrylic acid and (6) chloroprene and acrylonitrile containing residual carboxyl groups. All of these polymers must be individually selected to be soluble in the same solvent as used for dissolving the other curable component or components including the curing agent.

The carboxylic acid groups of the above polymers may also be produced by treating conjugated diene polymers or copolymers which have been produced in the presence of a sodium salt with carbon dioxide and subsequently acidified to produce carboxyl groups on the polymer chain. For example, a carboxyl-terminated polybutadiene produced in the above manner has an acid number of 17 and an average molecular weight of about 7,000.

The other curable component of the above system comprises a hydroxyl or carboxyl containing polyester (adduct or polymer) or a vinyl chloride copolymer soluble in organic solvents. The polyester polymers generally have an average molecular weight not higher than about 10,000; however, the vinyl chloride polymers are available in a range of molecular weights that extend considerably beyond 10,000; and many of which are somewhat indeterminate. Thus, the hydroxyl or carboxyl containing polyester or poly vinyl chloride are selected on the general basis of solvent dissolution, and those physical properties generally sought in adhesive formulations.

Preferably, this curable polymer should be a solid elastomer in order to provide the required physical strength, compatibility and adhesion when applied to the surface. This curable polymer is also cured with the curing agent to be discussed hereinafter to produce a strong bond of considerably higher strength than that obtained from the green strength polymer. For curing, the polymer must have active hydrogens in the form of hydroxyl or carboxyl groups. When the proportion of this active hydrogen containing solid polymer is equal to or greater than the amount of carboxyl-containing diene rubber, the active hydrogen groups of the polymer are preferably hydroxyl groups in order to prevent foaming. It is the active hydrogen which forms the sites for cross-linking as the result of the removal thereof from the polymer structure.

Carboxyl or, preferably, hydroxyl-terminated polyester polymers which are useful as this second curable component are prepared from one or more diols and one or more dibasic acids (the acids or the diols being in excess depending upon the type of termination desired) by interaction at elevated temperatures, such as 150 to 200° C., in the presence of an esterification catalyst. Some examples of such linear polyester polymers are the polymerization products of neopentyl glycol and succinic acid; diethylene glycol and adipic acid; neopentyl glycol and diglycolic acid; diethylene glycol and adipic acid; polyethylene glycol and thiadipropionic acid; diethylene glycol, polyethylene glycol and oxydipropionic acid; 2,2-bis[4- (2-hydroxy-propoxy)phenyl]-propane and azelaic acid; diethylene glycol and diglycolic acid; propylene glycol, sebasic acid and isophthalic acid; and 3-methyl-3-azapentandiol-1,5 and azelaic acid.

The polyester polymer may be chain extended and made higher melting by reacting it with a diisocyanate in less than equivalent amount prior to incorporation into the adhesive composition. Examples of such diisocyanates are toluene diisocyanate, diphenyl methane diisocyanate and 4,4'-methylene di-o-tolylisocyanate. The chain-extended polyester still contains free hydroxyl or carboxyl groups capable of further reaction with additional isocyanates.

Among the useful active hydrogen carrying vinyl polymers which may serve as the other curable component of the system are those vinyl chloride polymers containing reactive hydroxyl or carboxyl groups and which are soluble in organic solvents for rubbers. But, when these vinyl polymers are used in place of or in conjunction with the solid polyester polymer to form the curable component, there may be used in addition a liquid polyester or polyether of the kind set forth in the succeeding paragraph in order to provide additional cross-linking sites for cure of the adhesive to a more rigid state. Preferred vinyl chloride polymers are the vinyl chloride-vinyl acetate copolymers containing residual vinyl alcohol, e.g. to provide at least about 2% (by wt.) reactive hydroxyl groups.

In addition to the diene polymer component and the intermediate solid active hydrogen containing polymer component, a polyfunctional liquid prepolymer may be incorporated in the mixture to impart the appropriate viscosity to the mixture and increase the ultimate bonding strength upon complete cure. Such low molecular weight liquids include the polyesters and polyether glycols containing a plurality of carboxyl or hydroxyl groups, preferably hydroxyl groups. The liquid polyesters may be prepared in a manner similar to the solid polyester polymer with the addition to the polymerization mixture of a substantial amount of a trifunctional monomer such as a polyfunctional alcohol or a polyfunctional acid, such as glycerol, trimethylol propane, mannitol, pentaerythritol, trimesic acid, citric acid, fumaric acid and benzene tetracarboxylic acid. The quantity of this polyfunctional monomer in the polymerization mixture is usually maintained within about 1 to about 50 weight percent.

The polyether glycols may be prepared by adding an alylene oxide to a polyol usually in the presence of an alkaline catalyst. Some examples of such polyether glycols are the adducts from ethylene glycol and ethylene oxide or propylene oxide; water and ethylene oxide; 1,4-butane diol and ethylene oxide; hydroquinol and propylene oxide; polyethylene glycol and butylene oxide; glycerine and propylene oxide or hexane triol and propylene oxide.

The cross-linking or curing agent is an organic compound capable of addition to the curable polymers through the site opened by the removal of the active hydrogen. These cross-linking or curing agents include diisocyanates, preferably the aromatic and aliphatic diisocyanates. Among the polyisocyanates which may be used in accordance with this invention as the cross-linking agents are toluene diisocyanate, diphenyl methane diisocyanate, methylene di-p-phenyl diisocyanate, 4,4'-diphenyl diisocyanate, 4,4'-methylene di-o-tolylisocyanate, p-phenylene diisocyanate, hexamethylene diisocyanate, 4-methyl-m-phenylene diisocyanate, s-phenyl triisocyanate, 5-trifluoromethyl-m-phenylene diisocyanate, 3,3'-dichloro-4,4'-biphenyl diisocyanate, tetracholoro-p-phenylene diisocyanate, and adducts, diisocyanate and polyols, such as the adduct of hexamethylene diisocyanate and trimethylol propane.

An example of a two-part contact bond adhesive herein disclosed and defined includes as one separate part, a liquid solution of a diene rubber, such as 100 parts of a copolymer of butadiene-1,3 and acrylonitrile containing carboxyl functional groups, and 100 parts of hydroxyl-terminated polyester, such as neopentyl glycol adipate, in an organic solvent, such as methyl ethyl ketone. This first part may also include fillers, such as silica and titanium dioxide. The first part solution may also contain 100 parts of a liquid polyester or a liquid polyether glycol as previously described. The second part of the system contains the required amount (usually stoichiometric) of cross-linking agent, such as hexamethylene diisocyanate or adduct thereof with trimethanol propane. The diisocyanate is preferably also in solution in a solvent similar to the solvent of the first part or in a solvent compatible to the solution of the first part, such as ketone. These two parts are maintained separate until it is desired to form the bond. At that time, the two parts are admixed thoroughly and the resultant adhesive is applied to both surfaces to be bonded together, such as two wood surfaces. The adhesive composition is allowed to dry for a few minutes or until solvent has evaporated and then the surfaces are pressed together, the adhesive immediately bonds the surfaces together with sufficient strength that the joint is maintained without the use of clamps so the adhesive cures at room temperature over a period of several hours. The strength of the joint increases until the adhesive is completely cured. In some instances, warming or heating of the adhesively bonded surface will aid in completing the cure in a shorter period of time. After the joint is completed by the curing, the laminate is inseparable and the bond is usually as strong as the wood itself.

Various organic solvents may be used for dissolving the polymer components and the curing agent of the present invention. The particular solvent utilized must be a common solvent for all the active ingredients of the system. These solvents include such organic compounds as the ketones, such as acetone, methyl ethyl ketone, and methyl isobutyl ketone; esters, such as methyl acetate, ethyl acetate, isopropyl acetate, butyl acetate, amyl acetate, "Cellosolve" acetate, and "Carbitol" acetate; and cyclic ethers, such as tetrahydrofuran, dioxane, tetrahydro-2-methylfuran, tetrahydropyran, trimethylene oxide, alpha-alpha-dimethylene oxide, dioxolane, 2-methyl-1,3-dioxolane, 2,6-dimethyl-tetrahydropyran, and 2,3-dimethyl-1,4-dioxane. The solvent should be sufficiently volatile that it will be easily and rapidly evaporated under the environment of the bonding operation. Mixtures of solvents may be used without departing from the scope of this invention.

Various additives may be included in the above system in either the curable polymer component or in the curing agent component. For example, antioxidants, such as sym-di-beta-naphthyl-paraphenylenediamine and 4,4'-dithiodimorpholine, may be employed as an additive. Pigments are often included in such compositions, such as carbon black and titanium dioxide.

In general, the amount of the diene polymer component of the system is between about 30 and 70 weight percent of the total active ingredients (excluding solvent, fillers, etc.). The important feature is that sufficient diene rubber be utilized to adequately hold the bond together until complete curing is effected. The amount of intermediate molecular weight curable polymer is similarly within the range of 30 to 70 weight percent of the total active ingredients. When a liquid polyester or a polyether glycol is used in addition to the solid polyester a vinyl polymer, the weight ratio of the solid polyester or vinyl polymer to liquid polyester or glycol is about 0.5:1 to about 2:1.

The amount of curing agent or cross-linking agent utilized in this system should be sufficient to complete the curing of the curable polymers. Usually a stoichiometric equivalent of the curing agent to the total of curable polymers is utilized, and this amount, of course, depends upon the number of active hydrogen sites in the curable polymers. It is preferred, however, to utilize not more than 20 percent stoichiometric excess of the curing agent. In general, the weight ratio of curing agent to curable polymers is between about 0.2:1 to 0.5:1.

The surfaces to which the adhesive composition of the present invention is particularly applicable are wood surfaces. The present adhesive also is adequately adherent to metal surfaces, such as copper. Other surfaces to which the adhesive may be applied include synthetic plastic and paper.

The particular adhesive composition of the present invention is superior to present day adhesives in that in its cured condition the bond is solvent resistant and stable up to temperatures of 150° C. and above. The composition in its preferred form is self-curing at room temperature, and temperatures up to about 50° C. may be used in such a system to advantage if faster cures are desired. The composition also possesses "dry tack" or affinity for its own surfaces, but the adhesive is not tacky to the touch. The diene rubber gives the adhesive very good quick strength and initial bond strength. Upon curing, the adhesive possesses high resistance to cold flow and good heat stability.

The following example is offered as a better understanding of the invention and the example as such should not be considered unnecessarily limiting to the invention.

*Example*

The following adhesive compositions were made up and tested under comparable conditions. Adhesive compositions A through E are shown in Table I. Compositions A and B are shown for comparative purposes with compositions C through E which are compositions in accordance with the teachings of the present invention.

TABLE I

| Composition A: | Parts by weight |
|---|---|
| Solid ethylene glycol adipate (extended with toluene diisocyanate acid number based on hydroxyl content=10) | 100 |
| Polyisocyanate in 75% solids solution of ethyl acetate (3 parts toluene diisocyanate +2 parts of trimethylol propane) | 25 |
| Solvent (equal parts of methyl ethyl ketone and ethyl acetate) | 375 |
| Composition B: | |
| Neoprene | 100 |
| Phenolic resin | 50 |
| Magnesium oxide | 15 |
| Solvent (equal parts of methyl ethyl ketone, toluene and heptane) | 616 |
| Composition C: | |
| Diene rubber (80:20 butadiene-acrylonitrile containing 2–5% acid) | 50 |
| Solid ethylene glycol adipate (extended with toluene diisocyanate, acid number based on hydroxyl content=10) | 50 |
| Polyisocyanate in 75% solids solution of ethyl acetate (3 parts toluene diisocyanate and 2 parts of trimethylol propane) | 30 |
| Solvent (equal parts of methyl ethyl ketone and ethyl acetate) | 400 |
| Composition D: | |
| Diene rubber (80:20 butadiene-acrylonitrile containing 2–5% acid by wt.) | 50 |
| Solid ethylene glycol adipate (extended with toluene diisocyanate, acid number based on hydroxyl content=10) | 50 |
| Liquid ethylene glycol adipate terminated with trimethylol propane | 20 |
| Polyisocyanate in 75% solids solution of ethyl acetate (3 parts toluene diisocyanate and 2 parts of trimethylol propane) | 60 |
| Solvent (equal parts of methyl ethyl ketone and ethyl acetate) | 400 |

TABLE I—Continued

Composition E: Parts by weight
  Diene rubber (80:20 chloroprene-acrylonitrile
    polymer containing about 1% acid) _____ 100
  Solid vinyl polymer (91% vinyl chloride, 3%
    vinyl acetate and 6% vinyl alcohol to provide
    about 2% by weight reactive hydroxyl
    groups) _____ 25
Composition E:
  Liquid ethylene glycol adipate terminated with
    trimethylol propane _____ 15
  Diene rubber tackifier (naturally occurring
    100% solids gasoline insoluble phenolic
    wood rosin derivative, "Vinsol" resin) ____ 20
  Polyisocyanate in 75% solids solution of ethyl
    acetate (3 parts toluene diisocyanate and 2
    parts of trimethylol propane) _____ 60
  Solvent (equal parts toluol and methyl ethyl
    ketone) _____ 480

With respect to composition E, the "Vinsol" resin extends the area of coverage of the composition and is in the nature of a filler.

TABLE II

| Tests | Composition | | | | |
|---|---|---|---|---|---|
| | A | B | C | D | E [1] |
| 1 Hour Dry Test, Immediately 2"/min. Shear, p.s.i. | 21 | 78 | 93 | 95 | |
| Tested 3 Hours after Bonding 2"/min., p.s.i. | 10-15 | 103 | 70 | 102 | |
| 1 Day Aging, Pulled at Loading of 600-1,000 lbs/min., p.s.i. | 56 | 120 | 270 | 135 | 310 |
| 2 Days Aging, Pulled at Loading of 600-1,000 lbs/min., p.s.i. | 140 | 225 | [2] 800 | [2] 790 | |
| Dead Load, Heat Resistance on 1 sq. in. bond | | ([3]) | ([4]) | ([5]) | |

[1] The strength of bond on contact was sufficiently high that bond strength for periods shorter than one day were only visually observed and not gauge tested.
[2] Wood failure on some bonds.
[3] Failed 10 min. at 160° F., w./42 lb. load.
[4] Failed 85 min. at 300° F., w./65 lb. load.
[5] Failed 7 min. at 300° F., w./65 lb. load.

Various modifications of the amounts of components of the compositions of this invention as well as additional components may become apparent to those skilled in the art without departing from the scope of this invention.

I claim:

1. An organic solution comprising between 30 and 70 weight percent of a carboxyl containing conjugated diene polymer containing an average of about 0.1 percent to 10.0 percent by weight carboxyl groups, and between 30 and 70 weight percent of a solid polyfunctional polyester polymer containing active hydrogen functional groups selected from the group consisting of hydroxyl groups and carboxyl groups dissolved in an organic solvent.

2. A cured composition comprising an admixture of between 30 and 70 weight percent of a carboxyl containing conjugated diene polymer containing an average of 0.1 percent to 10 percent by weight carboxyl groups, and between 30 and 70 weight percent of a solid polyfunctional polyester polymer containing active hydrogen functional groups selected from the group consisting of hydroxyl groups and carboxyl groups cured with an organic polyisocyanate, the weight ratio of polyisocyanate to the total of diene polymer and polyester polymer being between 0.2:1 and 0.5:1.

3. Bonded surfaces, which surfaces are bonded together with an adhesive comprising an admixture of between 30 and 70 weight percent of a carboxyl containing conjugated diene polymer containing on the average of about 0.1 percent to about 10 percent by weight carboxyl groups, between 30 and 70 weight percent of a solid polyfunctional polyester polymer containing active hydrogen functional groups selected from the group consisting of hydroxyl groups and carboxyl groups and an organic polyisocyanate, the weight ratio of polyisocyanate to the total of diene polymer and polyester polymer being between 0.2:1 and 0.5:1.

4. Bonded surfaces, which surfaces are bonded together with an adhesive comprising an admixture of between 30 and 70 weight percent of a carboxyl containing conjugated diene rubber of butadiene and acrylonitrile containing on the average of about 0.1 percent to about 10 percent carboxyl groups by weight, between 30 and 70 weight percent of a solid ethylene glycol adipate polymer terminated with hydroxyl groups and an organic polyisocyanate, the weight ratio of polyisocyanate to the total of diene polymer and polyester polymer being between 0.2:1 and 0.5:1.

5. An organic solution comprising between 30 and 70 weight percent of a conjugated carboxyl containing diene rubber containing on the average of about 0.1 percent to about 10 percent carboxyl groups by weight and having a molecular weight greater than 20,000, and between 30 and 70 weight percent of a solid polyfunctional polyester polymer containing active hydrogen functional groups selected from the group consisting of hydroxyl groups and carboxyl groups and having a molecular weight not higher than 10,000 dissolved in an organic solvent.

6. An organic solution comprising a conjugated carboxyl containing diene rubber containing on the average of about 0.1 percent to about 10 percent carboxyl groups by weight and having a molecular weight greater than 20,000, between 30 and 70 weight percent of a solid polyfunctional polyester polymer terminated with hydroxyl groups and having a molecular weight not greater than about 10,000, and a liquid polyfunctional component selected from the group consisting of polyester polymers and polyether glycols containing hydroxyl groups dissolved in an organic solvent, the weight ratio of solid polyester to liquid component being 0.5:1 to 1.5:1.

7. An organic solution comprising an admixture of between 30 and 70 weight percent of a conjugated carboxyl containing diene rubber containing on the average of about 0.1 percent to about 10 percent carboxyl groups by weight and having a molecular weight greater than 20,000, and between 30 and 70 weight percent of a solid polyester polymer terminated with hydroxyl groups and having a molecular weight not greater than 10,000 dissolved in an organic solvent.

8. The solution of claim 7 in which said solvent is a liquid ketone.

9. The solution of claim 7 in which said solvent is a liquid cyclic ether.

10. The solution of claim 7 in which said solvent is a liquid organic ester.

11. A cured composition comprising between 30 and 70 weight percent of a conjugated carboxyl containing diene rubber containing on the average of about 0.1 percent to about 10 percent carboxyl groups by weight and having a molecular weight greater than about 20,000, and between 30 and 70 weight percent of a solid polyester polymer terminated with hydroxyl groups and having a molecular weight not greater than about 10,000 cured with an organic polyisocyanate, the weight ratio of polyisocyanate to the total of diene polymer and polyester polymer being between 0.2:1 and 0.5:1.

12. A cured composition comprising between 30 and 70 weight percent of a conjugated carboxyl containing diene rubber of butadiene and acrylonitrile containing on the average of about 0.1 percent to about 10 percent carboxyl groups by weight and having a molecular weight greater than about 20,000, and between 30 and 70 weight percent of a solid ethylene glycol adipate polymer terminated with hydroxyl groups and having a molecular weight not greater than about 10,000 cured with an organic polyisocyanate, the weight ratio of polyisocyanate to the total of diene polymer and polyester polymer being between 0.2:1 and 0.5:1.

13. An organic solution comprising a conjugated carboxyl containing diene rubber containing on the average of about 0.1 percent to about 10 percent carboxyl groups by weight and having a molecular weight greater than 20,000, between 30 and 70 weight percent of a solid vinyl chloride polymer containing reactive hydroxyl groups, and a liquid polyfunctional component selected from the group consisting of polyester polymers and polyether glycols containing hydroxyl groups dissolved in an organic solvent, the weight ratio of solid polymer to liquid component being 0.5:1 to 2:1.

14. A cured composition comprising between 30 and 70 weight percent of a conjugated carboxyl containing diene rubber containing an average of about 0.1 percent to 10 percent carboxyl groups by weight and having a molecular weight greater than about 20,000, and between 30 and 70% of a mixture of a solid vinyl chloride-vinyl acetate polymer having reactive hydroxyl groups, and a liquid polyfunctional component selected from the group consisting of highly branched polyester polymers and polyether glycols containing hydroxyl groups, the weight ratio of solid polymer to liquid polymer being about 0.5:1 to about 2:1, said composition having been cured with an organic polyisocyanate, the weight ratio of polyisocyanate to the total of diene polymer solid vinyl polymer and liquid polymer being between 0.2:1 and 0.5:1.

15. A curable, contact bond adhesive comprising a conjugated carboxyl containing diene rubber containing on the average of about 0.1 percent to about 10 percent carboxyl groups by weight, and having a molecular weight greater than 20,000, between 30 and 70 weight percent of a component selected from the group consisting of solid vinyl chloride polymers and solid polyester polymers containing reactive hydroxyl groups and a liquid polyfunctional component selected from the group consisting of polyester polymers and polyether glycols containing hydroxyl groups, the weight ratio of solid polymer to liquid component being 0.5:1 to 2:1, and an organic curing agent reactive with said carboxyl and hydroxyl groups to cure said adhesive.

16. A cured composition comprising between 30 and 70 weight percent of a conjugated carboxyl containing diene rubber containing an average of about 0.1 percent to 10 percent carboxyl groups by weight and having a molecular weight greater than about 20,000, and between 30 and 70% of a mixture of a solid component selected from the group consisting of solid vinyl chloride polymers and solid polyester polymers having reactive hydroxyl groups and a liquid polyfunctional component selected from the group consisting of highly branched polyester polymers and polyether glycols containing hydroxyl groups, the weight ratio of solid polymer to liquid polymer being about 0.5:1 to about 2:1, said composition having been cured with an organic polyisocyanate, the weight ratio of polyisocyanate to the total of diene polymer solid vinyl polymer and liquid polymer being between 0.2:1 and 0.5:1.

17. A contact bond curable adhesive composition comprising between 30 and 70 weight percent of a carboxyl containing conjugated diene polymer containing an average of about 0.1 percent to 10 percent carboxyl groups by weight, and between 30 and 70 weight percent of a solid polyfunctional component selected from the group consisting of vinyl polymers and polyester polymers containing active hydrogen functional groups selected from the group consisting of hydroxyl groups and carboxyl groups dissolved in an organic solvent, and an organic curing agent reacting with said carboxyl and active hydrogen functional groups to cure said composition.

18. A contact bond curable adhesive composition comprising between 30 and 70 weight percent of a carboxyl containing conjugated diene polymer containing an average of about 0.1 percent to 10 percent carboxyl groups by weight, and between 30 and 70 weight percent of a solid polyfunctional component selected from the group consisting of vinyl polymers and polyester polymers containing active hydrogen functional groups selected from the group consisting of hydroxyl groups and carboxyl groups dissolved in an organic solvent, and an organic polyisocyanate curing agent, the weight ratio of curing agent to diene polymer and solid polyfunctional component being about 0.2:1 and 0.5:1.

No references cited.

MORRIS LIEBMAN, *Primary Examiner.*

L. T. JACOBS, *Assistant Examiner.*